April 7, 1942. S. A. LARSON 2,279,238
PISTON
Filed May 31, 1939
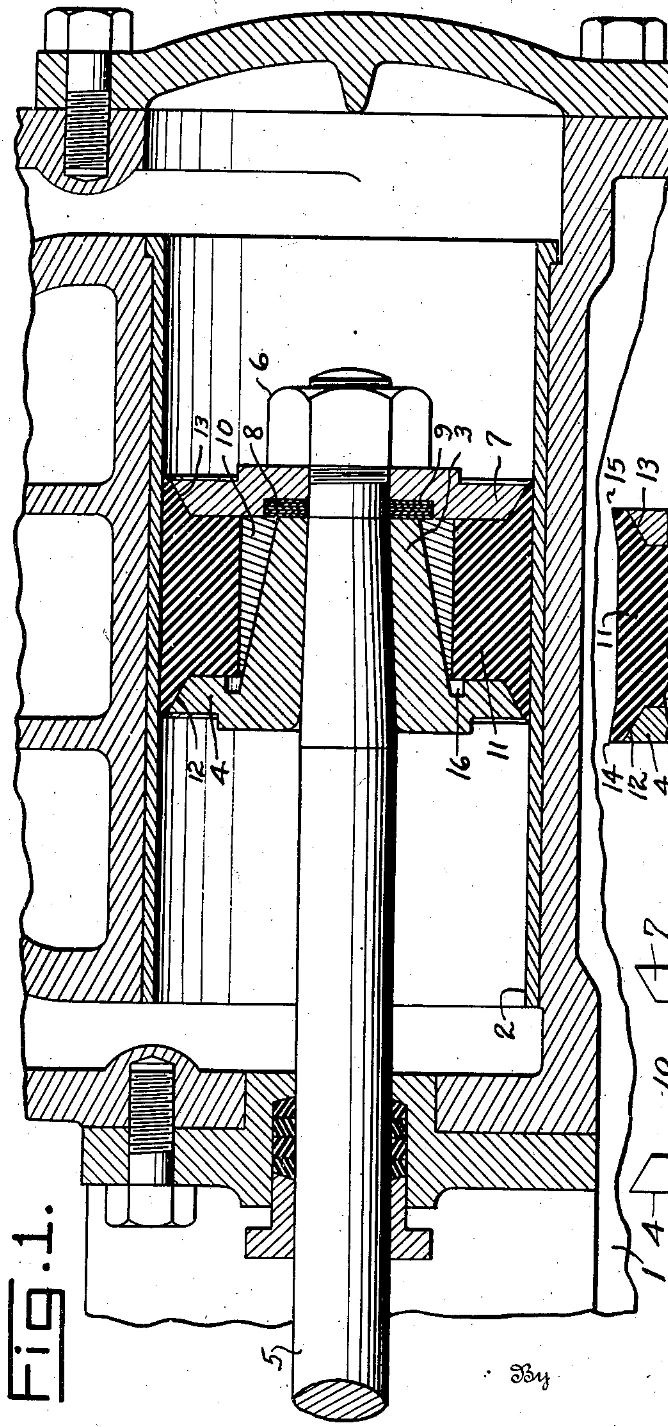
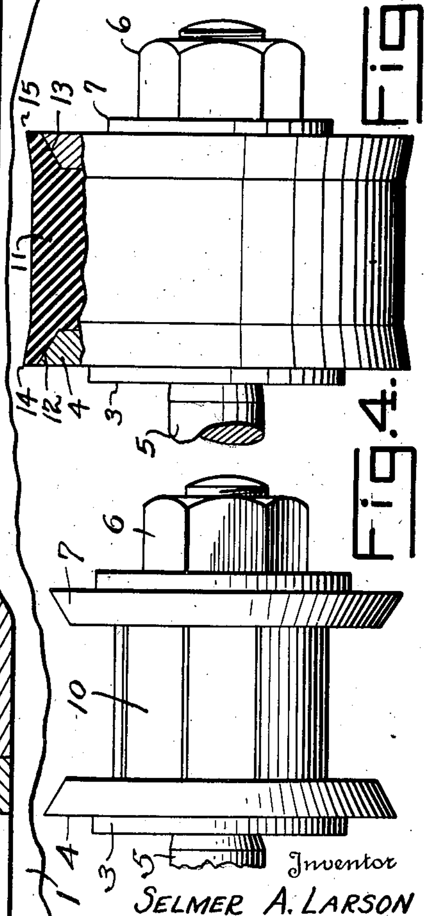
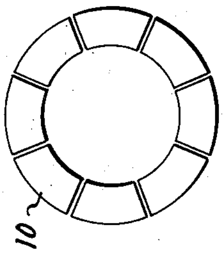
Inventor
SELMER A. LARSON
By E. V. Hardway
Attorney Patented Apr. 7, 1942 2,279,238

UNITED STATES PATENT OFFICE 2,279,238

PISTON

Selmer A. Larson, Newgulf, Tex.

Application May 31, 1939, Serial No. 276,686

3 Claims. (Cl. 309—4)

This invention relates to a piston.

An object of the invention is to provide a piston of such construction as to adapt it for efficient use in pumps, particularly slush pumps, which are required to handle gritty fluids such as drilling fluids, although the piston is capable of general use.

Another object of the invention is to provide a piston of the character described including a surrounding resilient sleeve formed of rubber or similar resilient material and shaped to fit closely within the pump liner and to form a fluid tight seal therewith, with means for expanding the sleeve to take up wear.

It is another object of the invention to provide a piston of the character described of such construction that when the sleeve is expanded to take up for wear the ends of the sleeve will be expanded slightly more than the intermediate portion of the sleeve thus forming, at all times, outwardly directed lips which ride against the liner walls and form efficient seals therewith.

With the above and other objects in view the invention has particular relation to certain novel features of construction, arrangement of parts and use, an example of which is given in this specification and illustrated in the accompanying drawing, wherein:

Figure 1 shows a longitudinal, sectional view of the piston shown mounted in a pump liner, the pump and liner being shown also in section.

Figure 2 shows a side elevation of the piston, partly in section,

Figure 3 shows an end view of the slip assembly employed, and

Figure 4 shows a side elevation of the piston with the packing element removed therefrom.

In the drawing the numeral 1 designates a pump. The cylinders of the pump have the usual cylindrical liners as 2 in which the piston operates.

The numeral 3 designates a frusto-conical shaped expander forming the piston body and whose large end has the external, annular flange 4 forming an end plate which is integral with the body. This piston body is mounted on the piston rod 5 one end of which has a tapered fit through the body and extends beyond it and is threaded to receive the clamp nut 6. On the extended end of the rod, and clamped in place by the nut 6, there is a removable end plate 7 having an inside, annular, countersunk recess 8 around the rod to receive the shims 9.

Around the expander 3 there is an assembly of wedge-shaped slips 10. The outer contour of the assembly is cylindrical. The inner sides of the slips are shaped to conform to the outer contour of the expander 3 and are tapered to conform to the taper of said expander. When the expander and slips are assembled with the end plates the surrounding resilient sleeve 11 is assembled as shown in Figures 1 and 2, said sleeve 11 fitting closely around the slip assembly.

The outer margins of the end plates 4 and 7 have the outwardly diverging, annular faces 12, 13. These faces have a greater pitch than the pitch of the external surface of the expander 3. The outer portion of the resilient sleeve 11 is flared each way so as to conform in pitch to the corresponding outer margins of the end plates.

It will be noted from an inspection of Figure 1 that the recess 8 is somewhat greater in diameter than the diameter of the adjacent end of the expander 3 so that the shims overlap the joint between the expander and the wedge-shaped slips. This joint will thereby be broken or sealed so as to assist in excluding the gritty fluid under pressure from passing between the parts of the piston. When the piston is assembled, as shown in Figure 1, and the nut 6 screwed home into clamping relation with the end plate 7 sufficient pressure will be applied to the outer widened portions of the sleeve 11 to slightly expand the ends of the sleeve as more clearly shown in Figure 2 thus in effect forming outwardly diverging end lips 14, 15. However, when the piston is inserted into the liner these lips will be compressed by the liner so that the piston will have a true, cylindrical external surface but the lips will form very tight seals with the liner.

In use the piston will wear and eventually permit leakage past it. In such a case the end plate 7 may be removed and one or more of the shims 9 taken out and when the end plate is replaced it may be forced by the nut 6 toward the fixed end plate 4 forcing the slips 10 further inwardly and expanding the sleeve 11 to take up the wear. This may be done from time to time as needed and the fixed end plate 4 has an inside, annular groove 16 opposite the apexes of the slips so as to increase their range of movement. In expanding the sleeve 11 as the end plates are moved toward each other the flared faces 12, 13 will expand the ends of the sleeve 11 faster than the slips 10 expand the sleeve itself. This is due to the fact that the faces 12, 13 have a steeper pitch than the pitch of the external surface of the expander 3. The slips 14, 15 will thus at all times have a closer fitting contact with the liner 2 than the intermediate portion of the sleeve 11 thus forming effective seals with the liner to prevent leakage.

The drawing and description are illustrative merely and are not intended to restrict the invention to the precise structure shown.

What I claim is:

1. A piston comprising a frusto-conical expander forming a piston body, an end plate formed integrally with the large end of the expander, a removable end plate at the other end of the expander, said removable end plate having an inside annular recess, shims in the recess between the removable end plate and the adjacent end of the expander, means for clamping the end plate in assembled relation with the expander, an assembly of wedge shaped slips fitted around the expander between the end plates, a sleeve of resilient material around said assembly between the end plates, the outer margins of the end plates being formed with diverging tapering faces having a greater pitch than the pitch of the external surface of the expander and the ends of the sleeve having portions overlying said faces whose inner sides are shaped to fit closely against said faces.

2. A piston comprising a frusto-conical expander forming a piston body, an end plate formed integrally with the large end of the expander, a removable end plate at the other end of the expander, said removable end plate having an inside annular recess, shims in the recess between the removable end plate and the adjacent end of the expander, means for clamping the end plate in assembled relation with the expander, an assembly of wedge shaped slips fitted around the expander between the end plates, a sleeve of resilient material around said assembly between the end plates, the outer margins of the end plate being formed with diverging tapering faces having a greater pitch than the pitch of the external surface of the expander and the ends of the sleeve having portions overlying said faces whose inner sides are shaped to fit closely against said faces, said fixed end plate having an inside annular grove opposite the apexes of the slips.

3. A piston comprising an expander having an external tapering surface, an end plate on one end of the expander, a removable end plate at the other end of the expander, an assembly of wedge-shaped slips surrounding the expander between the end plates whose outer surfaces are of cylindrical contour, a resilient sleeve around the assembly between the end plates, shims between the removable end plate and the assembly, means for clamping the removable end plate against the shims whereby to expand the sleeve, the outer margins of the end plates being formed with diverging tapering faces having a greater pitch than the pitch of the external surface of the expander and the ends of the sleeve having portions overlying said faces whose inner sides are shaped to fit closely against said faces.

SELMER A. LARSON.